3,574,159
POLYMERIC LATICES
Edward Joseph Fetter, Springdale, and Frederick Lyle Andrew, Norwalk, Conn., assignors to American Cyanamid Company, Stamford, Conn.
No Drawing. Filed Dec. 22, 1967, Ser. No. 692,721
Int. Cl. C08d 1/09, 7/18
U.S. Cl. 260—29.7           10 Claims

ABSTRACT OF THE DISCLOSURE

Synthetic latex compositions comprising a polymer of a styrene monomer, a conjugated diolefin and an unsaturated acid or amide and from about 0.5 to about 10.0%, by weight, of various cyclohexyl sulfosuccinates, are disclosed.

BACKGROUND OF THE INVENTION

The adhesive, paint, paper and textile industries are, at present, intensely interested in water-based synthetic resins which may be useful for a variety of purposes. In order to fulfill various requirements, however, these water-based resin compositions, commonly termed latices must exhibit a favorable balance of properties in order to impart various qualities to films resulting therefrom and to surfaces or articles treated with said latices. One latex system which has been found to be particularly useful is produced utilizing polymers prepared from butadiene, styrene and a third copolymerizable material.

The latex properties of such modified butadiene-styrene systems which should be maintained at an optimum include particle size, coagulum level, mechanical stability, shelf stability, pigment acceptability, compatibility with various post-additives, foaming, viscosity and thixotrophy. Equally as important, are the properties of the films which are produced from said modified styrene-butadiene latices, said properties including adhesion, water resistance, clarity, uniformity and tack. While numerous compositions have been developed which satisfy one or more of the foregoing requirements in the latex and in the film produced therefrom, various deficiencies still exist in several of the properties so as to prevent the utilization of the latex or film for a plurality of particular service applications. That is to say, many commercial latices present a balance of the above-mentioned properties but fail to exhibit various other properties which are considered even more important for certain service applications. For example, the latex should have high surface tension. Additionally, the films produced therefrom should have excellent water spot and wet rub resistance. These difficultly achievable properties, when combined with those mentioned hereinabove, in a latex, are possessed by our novel latex compositions which may be utilized for a multiplicity of service applications, including paper and textile treatment, without subsequent modification.

As is well known, the mechanical stability of a polymer latex is a direct consequence of the control of the particle size of the polymerized materials therein. That is to say, too large a particle size will retard emulsion polymerization and too small a particle size will result in poor mechanical stability. Therefore, the above-mentioned balance of properties is more readily obtained during the polymerization of the monomers involved than by some subsequent mechanical or chemical modification of the polymerized material.

We have now discovered that said balance of properties can be attained by the use of a specific group of emulsifiers during the emulsion polymerization of a styrene-conjugated diolefin containing monomer mixture. Although a great variety of materials are known to be useful for this purpose, said known emulsifying agents are generally unreliable because they produce unpredictable results. Although many prior art systems, for example, see U.S. Pat. 3,329,640, produce somewhat balanced properties in the resultant latices and films deposited therefrom, we have now found that we can produce latices having at least as good a balance of common optimum properties as those of the prior art, and in addition thereto, a high latex surface tension. Furthermore the latex-derived films possess excellent clarity, uniformity and water spot and wet rub resistance.

SUMMARY

We have now discovered that the use of a specific class of emulsifying agents results in the production of modified styrene-butadiene polymer latex systems which possess the balance of properties mentioned hereinabove. The novel latex systems of the present invention can therefore be utilized for such applications as water-insensitive adhesives, water-resistant paper coatings, improved rug backing adhesives and improved textile coatings where high penetration of the latex into the textile, rug backing or other substrate is not desired and, even more importantly, cannot be tolerated.

DESCRIPTION OF THE INVENTION INCLUDING PREFERRED EMBODIMENTS

As mentioned above, we have now found that the use of a certain class of emulsifiers in the emulsion polymerization of butadiene-styrene monomer mixtures promotes the balance of properties described above and, in particular, combines the excellent properties of known prior art systems with those of high surface tension of the latex and clarity, uniformity, and water spot and wet rub resistance of the films deposited therefrom. The emulsifiers of the present invention may be broadly characterized as cyclohexyl sulfosuccinates and may be represented by the formula:

(I)

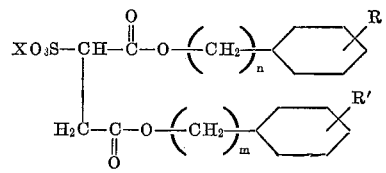

wherein X is a hydrogen or a salt forming radical, $n$ and $m$ are, individually, whole positive integers of 0–3, inclusive, and R and R' are, individually, hydrogen or an alkyl group of 1–3 carbon atoms, inclusive. The salt forming radical X which is not hydrogen includes any of the common monovalent cations. These include alkali metal cations, for example sodium, potassium and the like as well as ammonium, substituted ammonium, and quaternary ammonium cations. Among the substituted ammonium cations may be included methyl, dimethyl, trimethyl, tetramethyl, and other alkyl ammonium cations. Quaternary ammonium cations include the dialkyl piperidinium cations etc. and cations derived from amines such as ethylamine, diethylamine, triethylamine, mixtures thereof or other alkyl amines etc.

These sulfosuccinates, as well as methods for their preparation, are well known in the art as evidenced by U.S. Pat. Nos. 2,176,423, 2,414,015, 2,414,016 etc. which patents are hereby incorporated herein by reference. As can be readily appreciated, the above represented sulfosuccinates can be prepared by first, reacting the appropriate cyclohexyl alcohol (or mixture of alcohols) with maleic anhydride, and then sulfonating the so-formed product under conditions disclosed in the above-mentioned patents. By the use of a mixture of alcohols, mixed esters of the sulfosuccinate can be produced.

The monomers which are polymerized according to the instant invention in the presence of the above-described emulsifying agents, as indicated above, comprise a mixture of a styrene and a conjugated diolefin and an unsaturated acid or amide. The styrene and conjugated diolefin are utilized in amounts ranging from about 70% to about 30% of the styrene and, correspondingly, from about 30% to about 70% of the conjugated diolefin. The unsaturated acid or amide should be present in the monomer mixture in amounts ranging from about 0.5 to about 10.0%, by weight, based on the total weight of the monomers, the total weight of all the monomers, of course, equaling 100%.

Specific examples of useful styrene monomers include styrene per se, $\alpha$-methyl styrene, ar-alkyl and ar-dialkyl styrenes, halogenated styrenes such as $\alpha$-chloro styrene and the like. Examples of useful conjugated diolefins include 1,3-butadiene isoprene and the like.

Among the useful unsaturated acids and amides may be included acrylic acid, methacrylic acid, itaconic acid, fumaric acid, maleic acid, ethyl acid maleate, salts of such acids, mixtures thereof, acrylamide, methacrylamide, mixtures thereof and the like. For a disclosure of polymers of this type, see U.S. 3,338,858, which patent is hereby incorporated herein by reference.

Except for the specific class of emulsifiers mentioned hereinabove, any emulsion polymerization procedure employed in the art may be utilized. For example, batch, semi-continuous, or delayed monomer addition techniques may be employed wherein the monomers may be added separately, in admixture or in a pre-emulsified state as is known to those skilled in the art.

The proportion of emulsifier utilized in our novel process ranges from about 0.5% to about 10.0%, preferably from about 2.0% to about 7.0%, by weight, based on the weight of the monomers used during the reaction. The emulsifier may be utilized in smaller amounts i.e. amounts sufficient to conduct the polymerization under art-recognized conditions to produce a product, the properties of which can be further enhanced by post-addition of further emulsifier to bring the final concentration in the product to that range specified above according to the instant invention or, more preferably, the polymerization can be conducted utilizing an amount of emulsifier within the above range at the outset. The pH at which the polymerization is carried out is variable, i.e., the solution may be either neutral, slightly alkaline, or slightly acidic depending upon the particular monomers being polymerized or copolymerized as is recognized in the art. Likewise, the temperature of the emulsion polymerization is widely variable and may range from about $-10°$ C. to $175°$ C. or more. Preferably the polymerization reaction will be carried out at from about room temperature, $25°$ C. to about $100°$ C.

Polymerization is effected in the normal manner in the presence of catalytic amounts, e.g., 0.01% to 2% by weight, based on the weight of the monomer, of a water-soluble polymerization agent such as the well-known free-radical catalysts. Among such catalysts may be mentioned peracetic acid, hydrogen peroxide, persalts such as ammonium persulfate, sodium persulfate, potassium persulfate, potassium perborate, and the like.

Any of the other conventional regulators, stabilizers, activators, supplemental agents etc. conventionally employed in emulsion polymerization procedures can be used in the process of the invention. Among the stabilizers are the so-called protective colloids such as gelatin, casein, starch, carboxymethyl cellulose, gum arabic, gum tragacanth, and the like. The regulators include such compounds as diisopropyl xanthate, the higher mercaptans such as benzyl mercaptan, octyl mercaptan, decyl mercaptan, dodecyl mercaptan, cetyl mercaptan, octadecyl mercaptan, carbon tetrachloride, ethylene dichloride, hexachloroethylene, $C_5$ to $C_8$ aliphatic alcohols, and the like and electrolytes such as tetrasodium pyrophosphate etc.

The latices of the instant invention can be utilized as such or they may be modified by the addition thereto of any known additive such as calcium carbonate, etc. in amounts sufficient to satisfy the requirements for most industrial applications.

The following examples are set forth for purposes of illustration only and should not be construed as limitations on the present invention except as set forth in the appended claims. All parts and percentages are by weight unless otherwise specified.

EXAMPLE 1

To a suitable reaction vessel, chilled in an ice bath are added, as deionized water solutions, 10 parts of a 25% methacrylic acid soluion, 21 parts of a 3%

$$(NH_4)_2S_2O_8$$

solution, 13 parts of a 2% tetrasodium pyrophosphate solution and 75 parts of a 5% bis(cyclohexyl) S-sodium sulfosuccinate solution. 62 parts of styrene are then added and the vessel is purged with nitrogen, sealed and chilled in an ice bath. Into the vessel is then charged 60 parts of butadiene and 0.5 part of t-dodecyl mercaptan. The vessel is secured in a Launder-Ometer and the temperature of the bath is raised to $57°$ C. The polymerization is conducted over a 20-hour period with vigorous agitation. After the polymerization is terminated, the vessel is cooled and vented and the resultant latex is recovered. The properties thereof are set forth in Table I below.

EXAMPLE 2

The procedure of Example 1 is again conducted except that 5 parts of a 25% acrylamide solution are substituted for the methacrylic acid and 62 parts of the 5% sodium sulfosuccinate solution are utilized. The properties of the resultant latex are set forth in Table I, below.

TABLE I

| Property | Latex of Example 1 | Latex of Example 2 |
|---|---|---|
| Coagulum: percent (based on total latex). | 0.01 to 0.10 | 0. |
| Total solids, percent | 50.7 | 50.4. |
| Conversion, percent | 100 | 100. |
| Viscosity, cps.[1] | 180 | 450. |
| Particle size, average peak range, A | 1,500 to 1,800 | 1,250 to 1,900. |
| Surface tension, dynes/cm | 54 | 58. |
| pH | 5.5 | 6.8. |
| Mechanical stability,[2] coagulum-g./100 mls. | <0.1 | 0.5. |
| Latex film appearance—clarity, uniformity, etc. | Excellent | Excellent. |
| Film, water spot resistance [3] | Light haze after 45 minutes.[4] | Light haze after 5 minutes.[5] |
| Film, wet rub resistance [3] | Excellent | Excellent. |

[1] Brookfield, spindle No. 3, 50 r.p.m., room temperature.
[2] Hamilton Beach Mixer, 6300 r.p.m., shaft off center; latex pH adjusted to 9 with ammonium hydroxide before determination.
[3] Film age—2 hours.
[4] Film derived from a commercial latex containing butadiene/styrene/methacrylic acid polymer produced with commercial emulsifier failed in less than 5 minutes.
[5] Film derived from a latex containing butadiene/styrene/acrylamide polymer produced utilizing commercially available emulsifier fails in less than 10 seconds.

In the above table, the latex films were produced by casting the latex on glass with a 5 mil Bird applicator and drying for 2 hours at room temperature and humidity.

In the water spot test a drop of deionized water was placed on the film with an eyedropper. The film was then observed and the time lapse before haze formation in the area of the film under the drop was recorded.

In the wet rub test the film was contacted with a small pool of deionized water which was allowed to remain thereon for 5 minutes at room temperature. The film under the pool of water was then rubbed lightly with the finger and examined for re-emulsification or lifting of the film from the glass. In this test, a rating of poor was given to a film which could not withstand 10 rubs before failure.

A rating of fair was given a film which could withstand 10 to 20 rubs before failure. A rating of good to a film which could withstand 20 to 30 rubs, and a rating of excellent for a film that could withstand 30 rubs or more. A film derived from a commercially available latex failed the above wet rub test by delamination after two rubs.

EXAMPLES 3-5

Following the procedure of Example 1, the following sulfosuccinates were substituted for the succinate utilized therein, all else remaining equal. In each instance, comparable results were achieved.

(A) Bis(2-methyl cyclohexyl) S-sodium sulfosuccinate
(B) Bis(4-methyl cyclohexyl) S-sodium sulfosuccinate
(C) Bis(cyclohexylethyl) S-sodium sulfosuccinate Again following the procedure of Example 1, the following monomer mixtures were polymerized in the presence of the following emulsifiers, all else in Example 1 remaining equal. In each instance, latices having excellent properties were recovered.

EXAMPLE 6

A styrene-butadiene-acrylic acid (50/48/2) monomer mixture with bis(4-ethyl cyclohexyl) S-sodium sulfosuccinate.

EXAMPLE 7

A styrene-butadiene-itaconic acid (49/48/3) monomer mixture with bis(4-isopropyl cyclohexyl) S-potassium sulfosuccinate.

EXAMPLE 8

A styrene-butadiene-maleic acid (50/47/3) monomer mixture with bis(cyclohexyl) S-ammonium sulfosuccinate.

EXAMPLE 9

A styrene-butadiene-methacrylamide (50/49/1) monomer mixture with 1-cyclohexyl 4-(2-methyl cyclohexyl) sodium sulfosuccinate.

EXAMPLE 10

An α-methyl styrene-butadiene-methacrylic acid (50/40/10) monomer mixture with a 50/50 mixture of the succinates of Examples 1 and 4.

EXAMPLE 11

An isoprene-styrene-acrylamide (69/30/1) monomer mixture with the succinate of Example 1.

What is claimed is:

1. A synthetic latex composition consisting essentially of a polymer of from about 70% to 30% of a styrene monomer and, correspondingly from about 30% to 70% of a conjugated diolefin and from about 0.5% to 10.0%, of an unsaturated acid or amide, said percentages being by weight based on the total weight of the monomers, the total being 100%, and from about 0.5% to about 10.0%, based on the weight of said monomers, of an emulsifier having the formula:

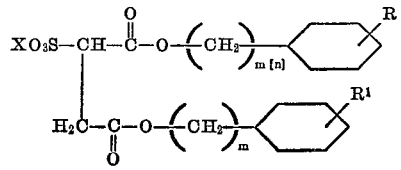

wherein X is a hydrogen or a salt forming radical, $m$ is a whole, positive integer of 0-3, inclusive, and R and R' are, individually, hydrogen or an alkyl group of 1-3 carbon atoms, inclusive, said composition having been produced by polymerizing said monomers in the presence of said emulsifier, water and an initiator.

2. A composition according to claim 1 wherein said styrene monomer is styrene.
3. A composition according to claim 1 wherein said conjugated diolefin is butadiene.
4. A composition according to claim 1 wherein said unsaturated acid is methacrylic acid.
5. A composition according to claim 1 wherein said styrene monomer is styrene, said conjugated diolefin is butadiene and said unsaturated acid is methacrylic acid.
6. A composition according to claim 1 wherein said unsaturated amide is acrylamide.
7. A composition of claim 1 wherein said emulsifier is bis(cyclohexyl) sodium sulfosuccinate.
8. A polymerization process for the production of the composition of claim 1 which comprises polymerizing, in an aqueous medium, a mixture consisting essentially of a styrene, a conjugated diolefin, an unsaturated acid or amide, and from about 0.5% to about 10.0% by weight, based on the total weight of said styrene, diolefin and acid or amide, of an emulsifier having the formula:

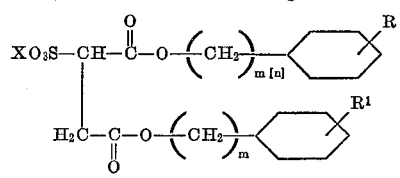

wherein X is hydrogen or a salt forming radical, $m$ is a whole, positive integer of 0-3, inclusive, and R and R' are, individually, hydrogen or an alkyl group of 1-3 carbon atoms, inclusive.

9. The process of claim 8 wherein said monomer mixture contains styrene, butadiene, and methacrylic acid or acrylamide.
10. Process according to claim 8 wherein said emulsifier is bis(cyclohexyl) sodium sulfosuccinate.

References Cited

UNITED STATES PATENTS

| | | | |
|---|---|---|---|
| 2,176,423 | 10/1939 | Jaeger | 252—48.6 |
| 2,414,015 | 1/1947 | Carnes | 106—13 |
| 2,414,016 | 1/1947 | Carnes | 106—13 |
| 3,296,170 | 1/1967 | Burkhart et al. | 260—29.6 |
| 3,297,615 | 1/1967 | Frazier et al. | 260—29.6 |
| 3,329,637 | 7/1967 | Vitalis | 260—29.6 |
| 3,329,640 | 7/1967 | Scotti et al. | 260—29.6 |
| 3,392,048 | 7/1968 | Rolik | 260—29.7 |

JULIUS FROME, Primary Examiner

A. H. KOECKERT, Assistant Examiner

U.S. Cl. X.R.

260—80.7

UNITED STATES PATENT OFFICE
CERTIFICATE OF CORRECTION

Patent No. 3,574,159    Dated April 6, 1971

Inventor(s) Edward Joseph Fetter; Frederick Lyle Andrew

It is certified that error appears in the above-identified patent and that said Letters Patent are hereby corrected as shown below:

Column 5, in the formula, "m[n]" should read -- m -- .

Column 6, in the formula, "m[n]" should read -- m -- .

Signed and sealed this 30th day of November 1971.

(SEAL)
Attest:

EDWARD M. FLETCHER, JR.
Attesting Officer

ROBERT GOTTSCHALK
Acting Commissioner of Patents